UNITED STATES PATENT OFFICE.

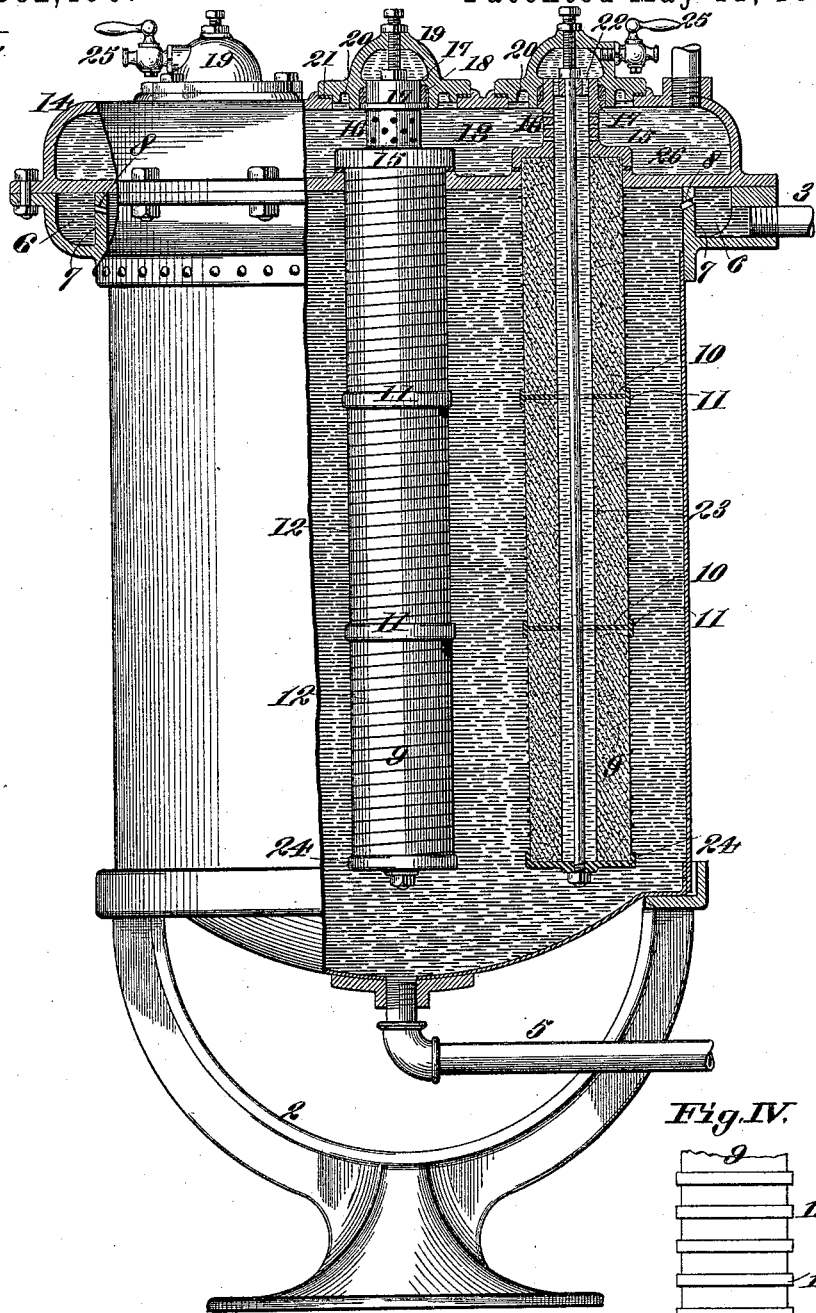

HERMAN C. STIFEL, OF ST. LOUIS, MISSOURI, ASSIGNOR, BY MESNE ASSIGNMENTS, TO THE AMERICAN TRIPOLI COMPANY, OF CARTHAGE, MISSOURI.

WATER-FILTER.

SPECIFICATION forming part of Letters Patent No. 582,400, dated May 11, 1897.

Application filed April 3, 1894. Serial No. 506,234. (No model.)

*To all whom it may concern:*

Be it known that I, HERMAN C. STIFEL, of the city of St. Louis, in the State of Missouri, have invented a certain new and useful Improvement in Water-Filters, of which the following is a full, clear, and exact description, reference being had to the accompanying drawings, forming part of this specification.

My present invention relates to a construction wherein the filtering medium is in the form of a stone or block, such as tripoli or other substance that is comparatively soft and liable to breakage under the pressure of the water from the inside.

My invention consists in features of novelty hereinafter fully described, and pointed out in the claims.

Figure I is part in side elevation and part in vertical section and illustrates my invention. Fig. II is a detail horizontal section of the inner wall of the supply-chamber with which the inlet-pipe connects. Fig. III is a top view of one of the caps. Fig. IV is a detail side view of one of the stones, showing a modification of the bands.

1 represents a cylinder or tank suitably supported on a base 2 or otherwise.

3 represents the inlet or supply pipe, 4 the clear-water pipe leading from the filter, and 5 the clean-out pipe.

At the upper end of the tank 1 is a chamber 6, into which the water is discharged from the pipe 3, and which has an inner wall 7, provided with perforations 8, through which the water passes from the chamber 6 into the tank. These perforations are made on an incline, so that the water passing therethrough is directed in a centrifugal and downward course and toward the filtering-stones, so that the current of water will have a tendency to wash dirt and sediment from the outer surface of the stones.

9 represents the filtering-stones, which may be in one or more sections each. I have shown each stone in three sections, joined at their adjacent ends by means of flat rings 10, having marginal flanges or rims 11. The rings 10 fit between the adjacent ends of the sections and the flanges 11 overlap the upper and lower ends, respectively, of the sections, as shown in Fig I. These rings hold the sections in line, and the flanges 11 also serve to strengthen the stones at these points and tend to keep the stones from breaking under the pressure of the water from the inside.

12 represents bands surrounding the stones, these bands being preferably in the form of a wire wrapped around the stones from end to end in a spiral form. These bands support and strengthen the stones throughout their lengths and avoid any possibility of the stones being broken by the pressure of the water from the inside, and by placing the bands spirally around the stones the incoming current of water washes the dirt and sediment from the outer surface of the stones more effectually than it would were the bands placed horizontally, when there would be more tendency for the sediment to settle on the upper edges of the bands, for by placing the bands on an incline the current of water washes the sediment around the stone in a downward direction. These bands around the filtering-stones avoid the frequent breakage which has heretofore occurred and add much to the length of time that a stone will last.

My invention may be carried out to a degree by shrinking plain flat bands onto the stones, as shown in Fig. IV.

13 represents a clear-water chamber in the hood 14 of the filter. The pipe 4 communicates with this chamber, and top rings 15, which fit over the ends of the stones above the bottom of the hood 14, have hollow necks 16, which extend through the chamber 13 and are perforated to allow the water to pass from the interior of the stones into the chamber 13. The upper ends of the necks 16 have collars 17 to receive packing 18 between the necks 16 and caps 19, which close openings 20 in the top of the hood 14 directly over the stones. Packing 21 may be placed between the caps and the hood. The caps are hollow and communicate with the hollow necks 16 by perforations 22 in the ends of the neck. The caps are held down and the stones supported by rods 23, passing through the caps, through the filtering-stones, and through disks 24, fitted onto the lower ends of the stones. The caps have petcocks 25, by which the water in each stone can be tested, and if the water is not clear, indicating that the stone is out of order, this stone by itself can be removed by simply taking off the cap and withdrawing the stone through the opening 20. Packing 26 is placed between the rings 15 and the bottom of the hood 14 to prevent unfiltered water getting into the chamber 13.

I claim as my invention—

1. In a water-filter, a tank, filtering-stones located within the tank, a chamber with which the supply-pipe connects and which is provided with an inner wall having inclined perforations for directing the water in a centrifugal and downward course, substantially as set forth.

2. In a water-filter, the combination of a tank, a hood located on top of the tank, and forming a water-chamber, stones extending through the bottom of said hood, rings having hollow perforated necks and fitted onto the upper ends of the stones, and caps fitted onto the necks of said rings and closing openings in the top of the hood; said openings being sufficiently large to permit the withdrawal of the stones therethrough; substantially as set forth.

3. In a water-filter, the combination of a tank, a hood fitted on top of the tank and forming a clear-water chamber, stones extending through the bottom of the hood, rings having hollow, perforated necks and fitted onto the upper ends of the stones, hollow caps fitted onto the necks of said rings, bolts passing through said caps and through the stones, disks on the lower ends of the stones through which said bolts pass, and petcocks fitted into the hollow caps; all substantially as and for the purpose set forth.

HERMAN C. STIFEL.

In presence of—
A. M. EBERSOLE,
C. G. EDWARDS.